US 8,378,269 B2

(12) United States Patent
Matsumoto et al.

(10) Patent No.: US 8,378,269 B2
(45) Date of Patent: Feb. 19, 2013

(54) WAFER THERMOMETER, TEMPERATURE MEASURING DEVICE, HEAT TREATMENT DEVICE AND METHOD FOR MEASURING TEMPERATURE OF HEAT TREATMENT UNIT

(75) Inventors: Toshiyuki Matsumoto, Amagasaki (JP); Naozo Sugimoto, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 1007 days.

(21) Appl. No.: 12/407,110

(22) Filed: Mar. 19, 2009

(65) Prior Publication Data

US 2009/0242545 A1 Oct. 1, 2009

(30) Foreign Application Priority Data

Mar. 31, 2008 (JP) ................. 2008-092594

(51) Int. Cl.
*H05B 3/68* (2006.01)
*G01K 7/00* (2006.01)
(52) U.S. Cl. ..................... 219/444.1; 374/163
(58) Field of Classification Search ............... 219/443.1, 219/444.1–446.1, 448.11, 448.12, 497, 390; 392/416, 418; 118/724, 725; 374/163, 166, 374/170, E7.001, E7.002, E7.004; 340/870.11, 340/870.15, 870.16, 870.17
See application file for complete search history.

(56) References Cited

U.S. PATENT DOCUMENTS

| 4,083,043 | A | * | 4/1978 | Breuer | 341/165 |
| 4,210,996 | A | * | 7/1980 | Amemiya et al. | 29/610.1 |
| 5,444,637 | A | * | 8/1995 | Smesny et al. | 702/127 |
| 6,691,068 | B1 | * | 2/2004 | Freed et al. | 702/187 |
| 7,323,661 | B2 | * | 1/2008 | Shimizu | 219/390 |
| 8,222,574 | B2 | * | 7/2012 | Sorabji et al. | 219/444.1 |

FOREIGN PATENT DOCUMENTS

JP 2007-178253 7/2007

* cited by examiner

*Primary Examiner* — Sang Paik
(74) *Attorney, Agent, or Firm* — Ditthavong Mori & Steiner, P.C.

(57) ABSTRACT

A wafer thermometer includes a wafer, a plurality of temperature sensors, a converter, a wafer data transmitter, and a photoelectric conversion element. The wafer has an upper surface divided to a plurality of regions. The plurality of temperature sensors are arranged at the plurality of regions, respectively. The converter is provided on the wafer and configured to convert signals output from the plurality of temperature sensors to temperature data. The wafer data transmitter is provided on the wafer and configured to transmit the temperature data converted by the converter. The photoelectric conversion element is provided on the wafer and configured to supply a current to the converter and the wafer data transmitter in response to light with which the photoelectric conversion element is irradiated.

19 Claims, 6 Drawing Sheets

US 8,378,269 B2

WAFER THERMOMETER, TEMPERATURE MEASURING DEVICE, HEAT TREATMENT DEVICE AND METHOD FOR MEASURING TEMPERATURE OF HEAT TREATMENT UNIT

CROSS-REFERENCE TO RELATED APPLICATIONS

The present application claims priority under 35 U.S.C. §119 to Japanese Patent Application. No. 2008-092594, filed Mar. 31, 2008. The contents of this application are incorporated herein by reference in their entirety.

BACKGROUND OF THE INVENTION

1. Field of the Invention

The present invention relates to a wafer thermometer, temperature measuring device, a heat treatment device, and a method for measuring temperature of a heat treatment unit.

2. Discussion of the Background

In a photolithography step in producing a semiconductor device, various kinds of heat treatments such as a heating process (pre-baking) after applying a resist liquid to a surface of a semiconductor wafer (referred to as the "wafer" hereinafter), a heating process (post exposure baking) after exposing a pattern, and a cooling process performed after each heating process are performed by a heating/cooling device in which the wafer is maintained at a predetermined temperature.

FIG. 8 is a longitudinal sectional view showing a conventional heating/cooling device 60, and FIG. 9 is a transverse sectional view taken along line A-A in FIG. 8.

Referring to FIG. 8, a cooling plate 61 for a cooling process and a heating plate 62 for a heating process are provided in line in a case 90 of the heating/cooling device 60. Each of the cooling plate 61 and the heating plate 62 is in a form of a disk having a certain thickness. A peltiert element (not shown) is incorporated in the cooling plate 61 to cool the cooling plate 61 to a predetermined temperature.

In addition, an elevator pin 63 for supporting and elevating a wafer after the wafer is set on the cooling plate 61 is provided under the cooling plate 61. This elevator pin 63 can be vertically moved by an elevator driving mechanism 64, and penetrates the cooling plate 61 from the bottom of the cooling plate 61 so as to project to the cooling plate 61.

Meanwhile, a heater 65 and a heating plate temperature sensor 62a are incorporated in the heating plate 62, and a controller 66 controls a heat value of the heater 65 based on a temperature detected by the heating plate temperature sensor 62a to maintain the temperature of the heating plate 62 at a set temperature. An elevator pin 67 and an elevator driving mechanism 68 are provided under the heating plate 62 similar to the cooling plate 61, and the wafer can be set on the heating plate 62 by the elevator pin 67.

In addition, as shown in FIG. 9, a carrying device 69 for transporting the wafer to the heating plate 62, and carrying the wafer from the heating plate 62 to the cooling plate 62 is provided between the cooling plate 61 and the heating plate 62. An opening 70 is provided on a side of the cooling plate 61 in the case 90 of the heating/cooling device 60 to take the wafer in and out of the heating/cooling device 60.

A shutter 71 is provided at the opening 70 to maintain an atmosphere in the heating/cooling device 60 at a predetermined atmosphere. A carrying arm 80 is provided so as to be opposed to the shutter 71, and when the shutter 71 is opened, the wafer is carried from the opening 70 into the heating/cooling device 60 by the carrying arm 80, and set on the heating plate 62 by the carrying device 69.

According to this heating/cooling device 60, it is important to previously measure a temperature distribution of the processing wafer set on the heating plate 62 to find temperature characteristics thereof on the heating plate 62, and uniformly heat the wafer on the heating plate 62 by appropriately correcting the temperature distribution based on a measurement result. Conventionally, in order to measure the temperature distribution of the processing wafer on the heating plate 62, the temperature distribution of the wafer is found by a wafer thermometer before the processing wafer is processed, and the temperature distribution of the processing wafer is corrected.

According to the wafer thermometer, the temperature measuring wafer is divided to a plurality of regions, and each of the temperature sensor and a transmitting device is arranged in each region. Data detected by the temperature sensors is transmitted by wireless, and the transmitted data is received by a receiving device provided in or outside the heating/cooling device 60. The transmitting device includes an A/D converter circuit, a memory, a transmitter circuit. However, since the A/D converter circuit has characteristics of being reduced in conversion accuracy as the temperature is increased, although the A/D converter circuit can measure the temperature up to 150° C., it cannot be used in an atmosphere in which the temperature reaches 250° C.

Thus, according to a temperature measuring wafer disclosed in Japanese Unexamined Patent Publication No. 2007-178253, a storage chamber is formed of an insulating material made of nano-crystal silicon (nc-Si) layer around it, and an A/D converting circuit, a memory, and a transmitting circuit are stored in the storage chamber.

However, according to the temperature measuring wafer, a thickness thereof is 3 mm or less, and it is considerably difficult to form the storage chamber with the insulating material made of the nano-crystal silicon (nc-Si), and a cost thereof is increased. Meanwhile, recently, an A/D converting circuit, a memory, and a transmitting circuit that can be used under an atmosphere at about 250° C. have appeared due to improvement in an element material. Thus, it is not necessary to store the A/D converting circuit, the memory, and the transmitting circuit in the storage chamber, and the A/D converting circuit, the memory, and the transmitting circuit can be arranged on the temperature measuring wafer, or the A/D converting circuit, the memory, and the transmitting circuit can be formed directly on the temperature measuring wafer when they are thinned.

However, in order to activate the A/D converting circuit, the memory, and the transmitting circuit, a power supply is needed. However, there is no thin-film battery that can be used in a wide range of temperature of 150° C. or more to −100° C., so that the range of the suitable temperature of the wafer thermometer is limited by the usable temperature of the battery. In addition, it is thought that a dry cell or a rechargeable secondary cell is housed in a storage chamber having an insulating structure and used, but it is necessary to replace or charge the cell.

SUMMARY OF THE INVENTION

According to one aspect of the present invention, a wafer thermometer includes a wafer, a plurality of temperature sensors, a converter, a wafer data transmitter, and a photoelectric conversion element. The wafer has an upper surface divided to a plurality of regions. The plurality of temperature sensors are arranged at the plurality of regions, respectively. The converter is provided on the wafer and configured to convert signals output from the plurality of temperature sensors to temperature data. The wafer data transmitter is provided on the wafer and configured to transmit the temperature data converted by the converter. The photoelectric conversion element is provided on the wafer and configured to supply a current to the converter and the wafer data transmitter in response to light with which the photoelectric conversion element is irradiated.

According to another aspect of the present invention, a temperature measuring device includes a wafer thermometer. The wafer thermometer includes a wafer, a plurality of temperature sensors, a converter, a wafer data transmitter, a photoelectric conversion element, and an external data receiver. The wafer has an upper surface divided to a plurality of regions. The plurality of temperature sensors are arranged at the plurality of regions, respectively. The converter is provided on the wafer and configured to convert signals output from the plurality of temperature sensors to temperature data. The wafer data transmitter is provided on the wafer and configured to transmit the temperature data converted by the converter. The photoelectric conversion element is provided on the wafer and configured to supply a current to the converter and the wafer data transmitter in response to light with which the photoelectric conversion element is irradiated. The external data receiver is provided to be apart from the wafer and configured to receive the temperature data transmitted from the wafer data transmitter.

According to further aspect of the present invention, a heat treatment device includes a wafer thermometer, a chamber, and a heat treatment unit. The wafer thermometer includes a wafer, a plurality of temperature sensors, a converter, a wafer data transmitter, and a photoelectric conversion element. The wafer has an upper surface divided to a plurality of regions. The plurality of temperature sensors are arranged at the plurality of regions, respectively. The converter is provided on the wafer and configured to convert signals output from the plurality of temperature sensors to temperature data. The wafer data transmitter is provided on the wafer and configured to transmit the temperature data converted by the converte. The photoelectric conversion element is provided on the wafer and configured to supply a current to the converter and the wafer data transmitter in response to light with which the photoelectric conversion element is irradiated. The chamber includes a first light source configured to irradiate the photoelectric conversion element with light. The heat treatment unit is provided in the chamber to heat or cool a processing wafer, the wafer thermometer being configured to detect a temperature of the heat treatment unit.

According to the other aspect of the present invention, a method for measuring a temperature of a heat treatment unit includes providing a wafer thermometer on the heat treatment unit for heating or cooling a processing wafer. The wafer thermometer has a photoelectric conversion element and temperature sensors. The photoelectric conversion element is irradiated with light. A temperature of the heat treatment unit is measured using the wafer thermometer. Temperature data showing the measured temperature is transmitted using power supplied from the photoelectric conversion element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
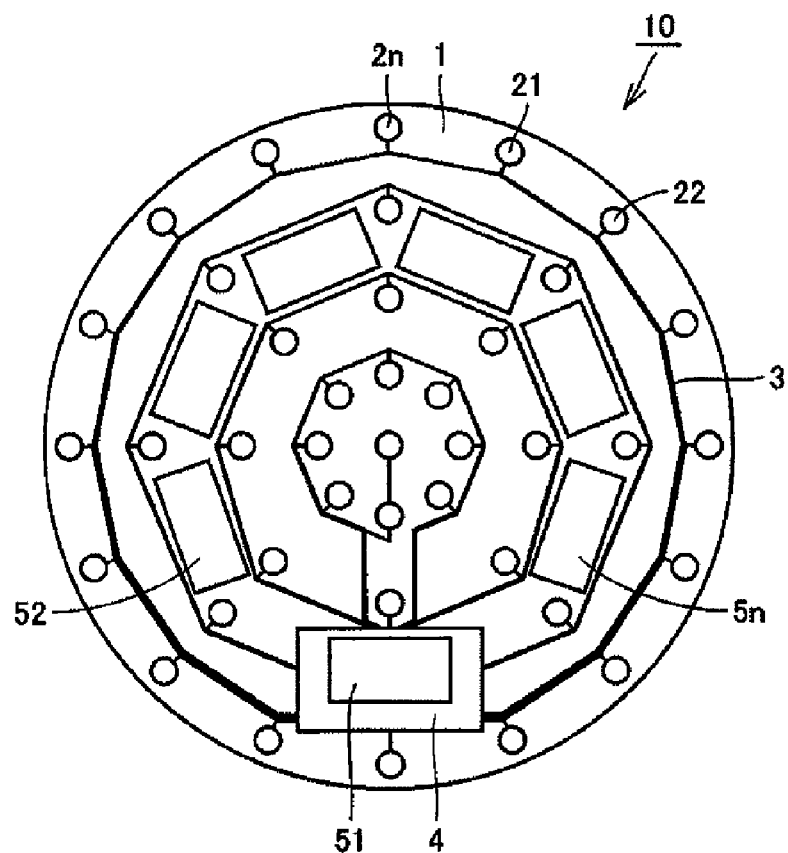
FIG. 1 is an outline view showing a wafer thermometer according to one embodiment of the present invention.

Embodiments will now be described with reference to the accompanying drawings, wherein like reference numerals designate corresponding or identical elements throughout the various drawings.

FIG. 1 is an external view showing a wafer thermometer according to one embodiment of the present invention.

Referring to FIG. 1, a wafer thermometer 10 is provided for measuring a temperature at which a processing wafer on a heating plate 62 or a cooling plate 61 is uniformly heated or cooled by previously detecting a temperature distribution of the processing wafer put on the heating plate 62 or the cooling plate 61 serving as a heat treatment unit shown in FIGS. 6A to 6C that will be described below, to grasp temperature characteristics thereof on the heating plate 62 or the cooling plate 61, and make a correction based on the grasped result.

The wafer thermometer 10 includes a temperature measuring wafer 1, temperature sensors 21, 22, ... 2n, a processing circuit 4, and solar cells 51, 52, ..., 5n serving as photoelectric conversion elements. The temperature measuring wafer 1 is divided into a plurality of regions, and the temperature sensors 21, 22, ..., 2n are arranged in the regions. Each of the temperature sensors 21, 22, ..., 2n may be any kind as long as it can detect a temperature change of a thermocouple and a resistance-temperature detector (RTD), for example and each of them is connected to the processing circuit 4 through a wiring 3.

In addition, when the temperature sensors 21, 22, ..., 2n are buried and sealed in the surface of the temperature measuring wafer 1, they can be prevented from deteriorating under a high-temperature gas atmosphere. The temperature sensors 21, 22, ..., 2n measure temperatures at 32 to 64 points on the surface of the temperature measuring wafer 1 to a precision of 0.05 to 0.01° C. The temperature sensors 21, 22, ..., 2n are arranged on the temperature measuring wafer 1 to measure the surface temperature.

The processing circuit 4 is composed of a thin-film integrated circuit, for example, and arranged at a region on the temperature measuring wafer 1 in which the temperature sensors 21, 22, ..., 2n are not arranged or the thin-film integrated circuit is directly formed on the temperature measuring wafer 1. The processing circuit 4 converts an analog signal as output values of the temperature sensors 21, 22, . . . , 2n to a digital signal, and externally transmits temperature data by wireless. The solar cells 51, 52, . . . , 5n are arranged at regions on the temperature measuring wafer 1 in which the temperature sensors 21, 22, . . . , 2n are not arranged, and supplies a current to the processing circuit 4 in response to external light. More preferably, only the solar cell 51 may be arranged on the processing circuit 4.

When the temperature sensors 21, 22, . . . , 2n are arranged so as to be dispersed over the whole wafer, the temperature can be uniformly measured from the regions of the whole wafer. When the plurality of solar cells 51, 52, . . . , 5n are provided, any one of them can receive light from an external light source and generate electricity, not only in a case where the light source is provided just above the wafer thermometer 10, but also in a case where a part of the wafer thermometer 10 is not irradiated with the light from the light source and a case where the wafer thermometer 10 is irradiated with the light from the light source by scanning, so that a power supply is prevented from being cut.

In addition, in a case where the position of the light to be applied to the temperature measuring wafer 1 is determined, at least one solar cell is to be provided at the corresponding position, so that space for the solar cells can be saved.

Figure 2:
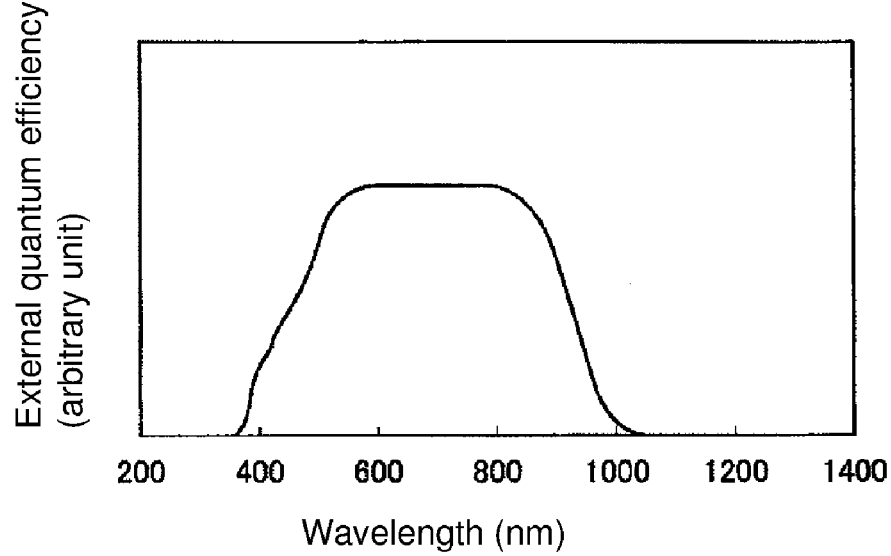
FIG. 2 is a view showing spectral sensitivity characteristics of a solar cell.

FIG. 2 is a view showing spectral sensitivity characteristics of the solar cells 51, 52, . . . , 5n. Each of the solar cells 51, 52, . . . , 5n is constituted such that a p-n junction is sandwiched between transparent electrodes and includes silicon, compound, organic, single-crystal, or amorphous solar cell. The spectral sensitivity characteristics in FIG. 2 show flat characteristics within a range of an audible frequency of 500 to 850 nm. More preferably, the solar cell that can receive the light within a range of about 400 nm to about 600 nm is preferred as the most efficient solar cell.

Figure 3:
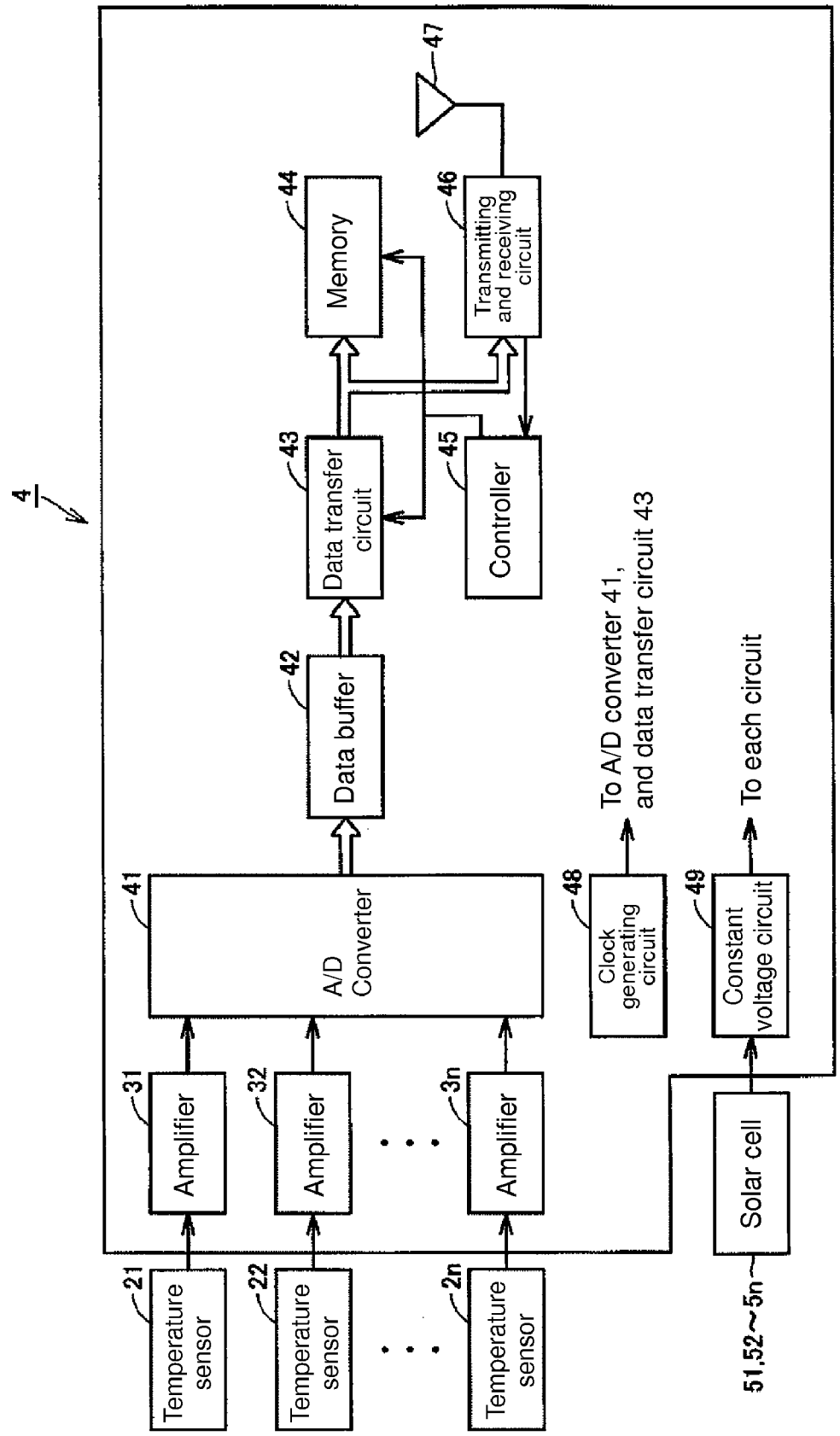
FIG. 3 is a block diagram showing a processing circuit shown in FIG. 1.

FIG. 3 is a block diagram showing the processing circuit 4 shown in FIG. 1. Referring to FIG. 3, the output signals of the temperature sensors 21, 22, . . . , 2n shown in FIG. 1 are inputted to amplifiers 31, 32, . . . , 3n and amplified, respectively and applied to an A/D converter 41. The A/D converter 41 converts the analog signals as the output signals of the temperature sensors 21, 22, . . . , 2n to parallel digital data and outputs the same. The converted digital data is applied to a data transfer circuit 43 through a data buffer 42.

The data transfer circuit 43 transfers the digital data to a memory 44 as temperature data. The memory 44 is composed of a nonvolatile memory and stores the temperature data detected by the temperature sensors 21, 22, . . . , 2n. When the temperature data is stored in the memory 44, the temperature data can be transmitted at any time according to need. A converter is composed of the amplifiers 31, 32, . . . , 3n, the A/D converter 41, the data buffer 42, the data transfer circuit 43, the memory 44, and a clock generating circuit 48.

A transmitting and receiving circuit 46 serving as a wafer data transmitter or a wafer data receiver is connected to an antenna 47, and the transmitting and receiving circuit 46 receives an external command signal and outputs the same to a controller 45. When the controller 45 receives the command signal, the controller 45 reads the temperature data stored in the memory 44, and externally transmits the data from the transmitting and receiving circuit 46 through the antenna 47 wirelessly. When the data is transmitted by wireless, ZigBee is used as one example of a short-range wireless communication standard. In addition, although optical communication may be used, since the optical communication is directional, the wireless communication is preferable.

The clock generating circuit 48 generates a clock signal and supplies the same to the A/D converter 41 and the data transfer circuit 43. The voltages generated by the solar cells 51, 52, . . . , 5n are applied to a constant voltage circuit 49. The constant voltage circuit 49 transforms the voltage generated by the solar cells 51, 52, . . . , 5n to a substantially constant voltage to supply a current to each circuit. Since the voltage is transformed to the substantially constant voltage, the operation of the processing circuit 4 can be stable.

It should be noted that the processing circuit 4 shown in FIG. 3 is formed on the thin-film integrated circuit in which the solar cells 52 . . . 5n are not provided.

Figure 4:
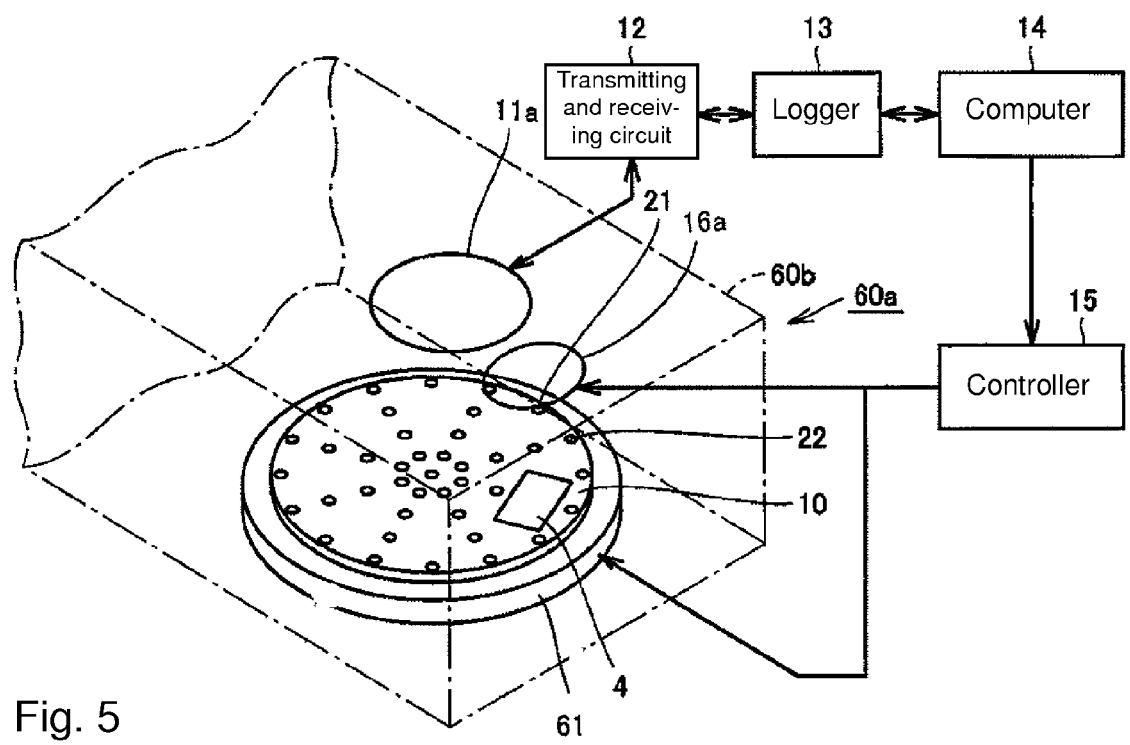
FIG. 4 is a view showing an example in which the wafer thermometer shown in FIG. 1 is set in a heating/cooling device to measure a temperature.
Figure 5:
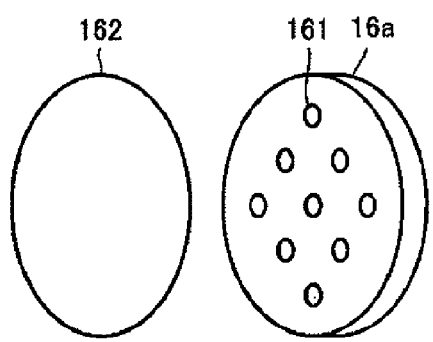
FIG. 5 is a perspective outline view showing a light source shown in FIG. 4.

FIG. 4 is a conceptual view showing an example in which the wafer thermometer 10 shown in FIG. 1 is put in a heating/cooling device 60a to measure a temperature, and FIG. 5 is a perspective view showing an outline of a first light source shown in FIG. 4.

Referring to FIG. 4, the heating/cooling device 60a has almost the same configuration as the heating/cooling device 60 described in a conventional example, in which the wafer is heated and cooled. Although the cooling plate 61 described in the conventional example is arranged in a case 60b serving as a heat treatment device, the heating plate 62 is not shown. A first antenna 11a and a first light source 16a serving as a light source or a first light source are provided at a ceiling of the case 60b. Although the first antenna 11a and the first light source 16a are separately provided in FIG. 4, the first antenna 11a may be arranged around the first light source 16a.

Although the first light source 16a is arranged so as to be adjacent to the first antenna 11a, and has many optical elements 161 such as incandescent lamps and luminescent diodes as shown in FIG. 5, the number of optical element may be one. The first light source 16a is turned on and off by a controller 15. More preferably, the first light source 16a is turned on only when the temperature is measured by the wafer thermometer 10.

According to a photolithography step in producing an actual semiconductor device, the first light source 16a is turned off during various kinds of heat treatments such as a heating treatment after a resist liquid is applied onto the surface of the processing wafer, a heating treatment after a pattern is exposed, and a cooling treatment performed after each heating treatment. This is because when the first light source 16a is kept on, a resist film of the wafer surface is exposed thereto. However, based on the fact that the resist is not exposed in a case where an emission frequency of the first light source 16a is about 400 nm or more, when an optical filter 162 is provided in front of the first light source so as to remove light other than the light having the emission wavelength of about 400 nm to about 600 nm as shown in FIG. 5, there is no problem even when the first light source 16a is kept on at all times. In addition, when a light source only emitting the light having the wavelength of about 400 nm and about 600 nm is used as the first light source 16a, there is no need to provide the optical filter 162.

The first antenna 11a is composed, for example, of a coil provided by winding a conductor spirally. A transmitting and receiving circuit 12 serving as an external data transmitter, an external data receiver or a chamber data transmitting/receiving unit transmits a command signal to transmit the temperature data to the wafer thermometer 10 through the first antenna 11a. The first antenna 11a catches the temperature data transmitted from the wafer thermometer 10 by wireless and applies it to the transmitting and receiving circuit 12. The transmitting and receiving circuit 12 gives the received data to a logger 13. The logger 13 samples the received data at each sampling time and make time-series data, calculates an average value and a deviation value based on the time-series data, displays the values, and outputs the temperature data to a computer 14.

The computer 14 incorporates a program for calculating a correction value to adjust the temperatures of the heating plate and the cooling plate 61, based on set temperatures T of the heating plate (not shown) and the cooling plate 61, and the calculated temperature data. When the computer 14 receives the temperature data from the transmitting and receiving circuit 12, the computer 14 executes the program automatically, and calculates the correction value based on a certain algorithm, and serves as a recorder for recording the temperature data in an internal memory. The controller 15 serves as a temperature controlling unit for controlling a heater of the heating plate or a peltiert element (not shown) incorporated in the cooling plate 61, based on a temperature measured by a temperature sensor (not shown) having the same temperature characteristics as those of the wafer thermometer 10.

Figure 6A:
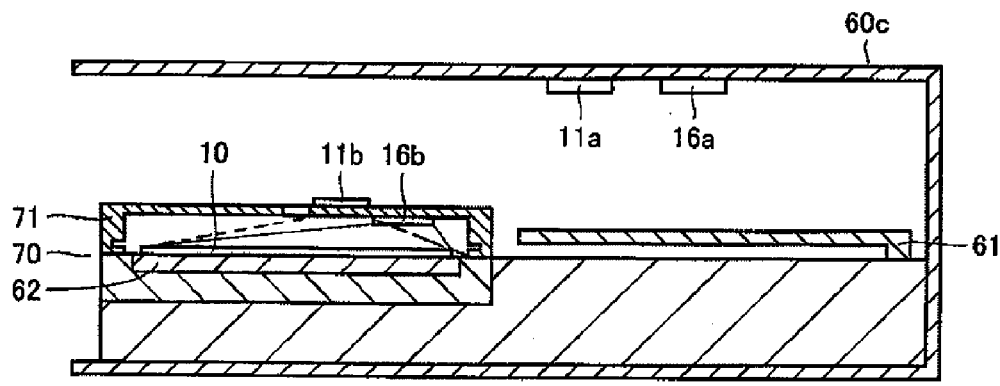
FIGS. 6A to 6C are views each illustrating one example in which temperatures of a heating plate and a cooling plate are measured by the wafer thermometer according to one embodiment of the present invention.
Figure 6B:
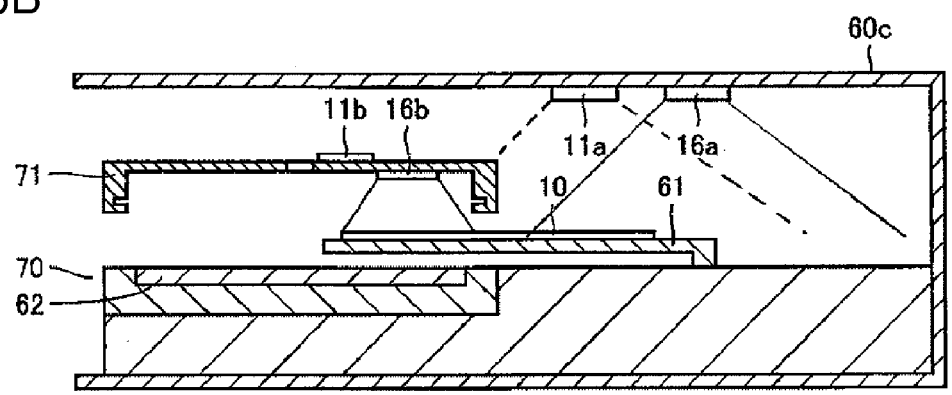
Figure 6C:
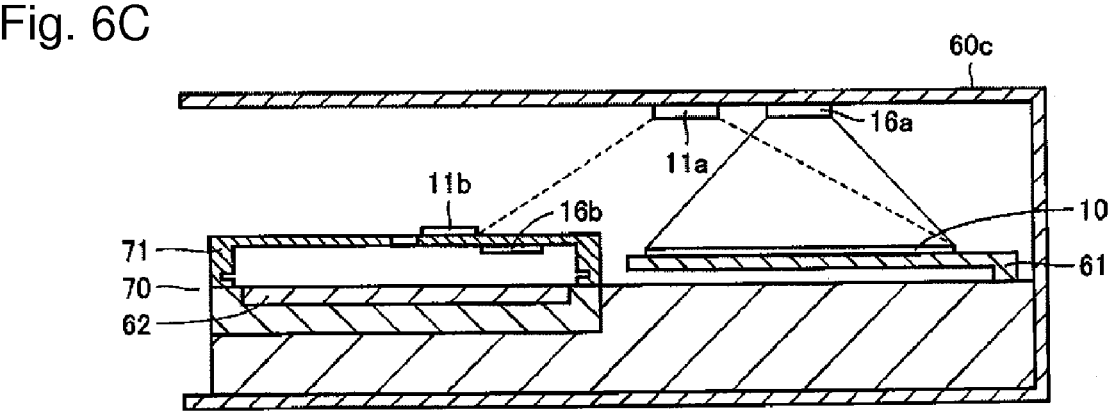

FIGS. 6A to 6C are views each illustrating one example in which the temperatures of the heating plate 62 and the cooling plate 61 are measured with the wafer thermometer 10 according to one embodiment of the present invention. Although only the cooling plate 61 is shown in FIG. 4, the heating plate 62 and the cooling plate 61 are shown in FIGS. 6A to 6C. FIG. 6A shows an example in which the wafer thermometer 10 is set on the heating plate 62 in a chamber 70 serving as a heating chamber in a case 60c, FIG. 6B shows an example in which a chamber cover 71 of the chamber 70 is open in the case 60c to take in and out the cooling plate 61 on which the wafer thermometer 10 is set, and FIG. 6C shows an example in which the wafer thermometer 10 is set on the cooling plate 61 to measure a cooling temperature.

Although an elevator driving mechanism are provided for the cooling plate 61 and the heating plate 62 as described in the conventional example, they are not shown in the figures. The heating plate 62 is arranged in the chamber 70, and the openable and closable chamber cover 71 is provided above the heating plate 62 in the chamber 70.

The first antenna 11a and the first light source 16a are arranged at the ceiling of the case 60c for the cooling plate 61 and the heating plate 62, and a second antenna 11b and a second light source 16b are arranged for the chamber 70. The second light source 16b is constituted similarly to the first light source 16a shown in FIG. 5. The first antenna 11a and the first light source 16a operate when the wafer thermometer 10 is on the cooling plate 61 and when the wafer thermometer 10 is moved from the cooling plate 61 to the chamber 70, and the second antenna 11b and the second light source 16b operate when the wafer thermometer 10 is in the chamber 70 and when the wafer thermometer 10 is moved from the cooling plate 61 to the chamber 70.

Since the first antenna 11a and the first light source 16a are not provided just above the heating plate 62, temperatures of the first antenna 11a and the first light source 16a can be prevented from rising. A window (not shown) through which an electric wave passes is provided in the chamber cover 71. In addition, the first antenna 11a and the second antenna 11b are formed of a metal material having characteristics resistant to a high temperature of 200° C. or more.

The cooling plate 61 has a function to transport the wafer between the heating plate 62 and the cooling plate 61, and a carrying device 69 described in the conventional example is not provided. However, the carrying device 69 may be provided without providing the function to transport the wafer in the cooling plate 61. It should be noted that the transmitting and receiving circuit 12, the computer 14, and the controller 15 shown in FIG. 4 are placed in a room temperature atmosphere (not shown) apart from the heating plate 62.

Figure 7:
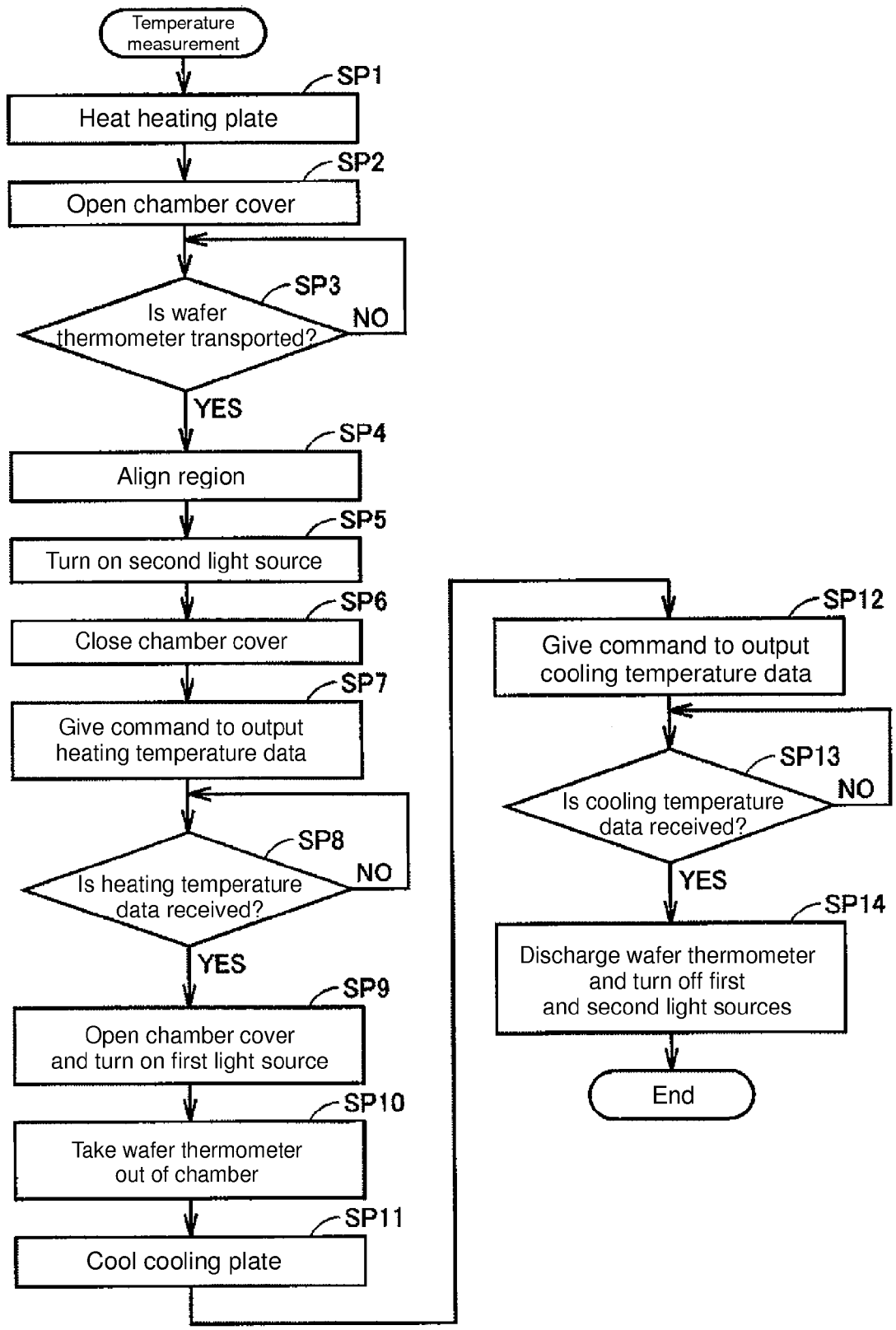
FIG. 7 is a flowchart to explain a temperature measuring operation according to one embodiment of the present invention.
Figure 8:
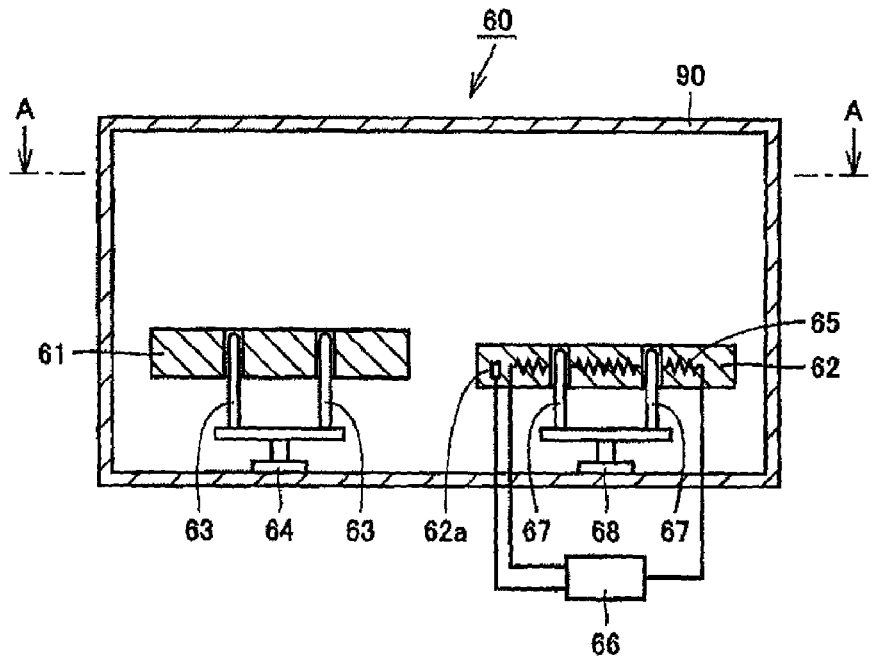
FIG. 8 is a longitudinal sectional view showing a conventional heating/cooling device.
Figure 9:
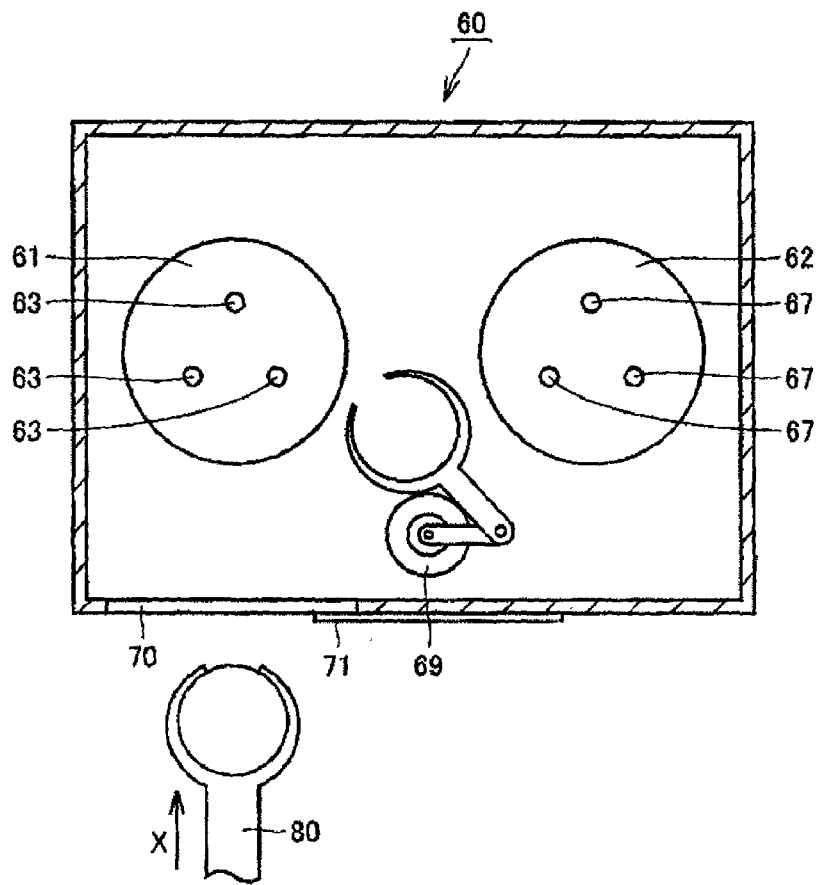
FIG. 9 is a transverse sectional view taken along line A-A in FIG. 8.

FIG. 7 is a flowchart for describing a temperature measuring operation according to one embodiment of the present invention.

Next, an operation for measuring a heating temperature and a cooling temperature with use of the wafer thermometer 10 will be described with reference to FIGS. 3 to 7.

Before the measurement of the temperature, the computer 14 heats the heating plate 62 to a set temperature, for example, to 150° C. in step (abbreviated as SP in the figure) SP1 shown in FIG. 7 so that the wafer can be heated. Thus, the wafer thermometer 10 is carried in from a left opening of the case 60c shown in FIG. 6A by a carrying arm 80 described in the conventional example, and the chamber cover 71 is opened and the wafer thermometer 10 is set on the heating plate 62 in step SP2.

The transportation of the wafer thermometer 10 to the heating plate 62 is detected by a sensor (not shown), and a detection signal thereof is transmitted to the computer 14 shown in FIG. 4. The computer 14 determines whether the wafer thermometer 10 is transported in the case 60c or not in step SP3. When it is determined that the thermometer is transported, the region is aligned in step SP4 to specify the position such as the direction of the wafer thermometer 10 in the case 60c.

As shown in FIG. 6B, the second light source 16b in the chamber 70 is turned on in step SP5. The computer 14 closes the chamber cover 71 in step SP6, and transmits a command signal to output heating temperature data to the wafer thermometer 10 through the transmitting and receiving circuit 12.

The solar cells 51, 52, ..., 5n of the wafer thermometer 10 receive the light from the second light source 16b and generate electricity and supply the voltage to the constant voltage circuit 49. The constant voltage circuit 49 makes the voltages from the solar cells 51, 52, ..., 5n substantially constant and supplies a current to each circuit. The transmitting and receiving circuit 46 receives the command signal to output the heating temperature data through the antenna 47, and gives the output command signal to the controller 45.

The temperatures of the corresponding parts of the heating plate 62 are measured by the temperature sensors 21, 22, ..., 2n of the wafer thermometer 10, and measurement signals are applied to the amplifier 31, 32, ..., 3n and amplified. The amplified measurement signals are converted to temperature data having a digital value by the A/D converter 41. This temperature data is transferred from the data transfer circuit 43 to the memory 44 through the data buffer 42. The measured temperature data is stored in the memory 44. The controller 45 reads the temperature data from the memory 44 in response to the command signal to output the heating temperature data, and transmits the temperature data from the transmitting and receiving circuit 46 through the antenna 47.

The transmitted temperature data is received by the transmitting and receiving circuit 12 through the second antenna 11b of the chamber 70, and outputted to the computer 14. The computer 14 waits until it receives the temperature data of the heating temperature in step SP8. When the computer 14 receives the temperature data, the chamber cover 71 is opened as shown in FIG. 6B and the first light source 16a is turned on in step SP9.

Then, the wafer thermometer 10 is taken out of the chamber 70 by the cooling plate 61 and the chamber cover 71 is closed in step SP10, while the wafer thermometer 10 is moved from the chamber 70 shown in FIG. 6A to the outside of the chamber 70 as shown in FIG. 6C through the state shown in FIG. 6B. Since the first light source 16a and the second light source 16b are turned on while the wafer thermometer 10 is taken out of the chamber 70, the processing circuit 4 can continue to measure the temperature.

The cooling plate 61 is cooled in step SP11. When the cooling plate 61 is cooled, the wafer thermometer 10 on the cooling plate 61 is cooled after being heated by the heating plate 62. Since the solar cells 51, 52, . . . , 5n receive the light from the first light source 16a and generate the voltage, the temperature data measured by the temperature sensors 21, 22, . . . , 2n after cooling is stored in the memory 44 by the processing circuit 4.

The computer 14 outputs a command signal to output cooling temperature data in step SP12 after cooling the cooling plate 61. This output command signal is transmitted from the transmitting and receiving circuit 12 through the first antenna 11a and received by the transmitting and receiving circuit 46 through the antenna 47 of the wafer thermometer 10. When the transmitting and receiving circuit 46 receives the command signal, the controller 45 of the processing circuit 4 reads the cooled temperature data stored in the memory 44 and externally transmits the data from the transmitting and receiving circuit 46 through the antenna 47.

The computer 14 waits until it receives the temperature data after cooling in step SP13, and when the computer 14 determines that the transmitting and receiving circuit 12 received the temperature data through the first antenna 11a, the wafer thermometer 10 is taken out of the case 60c and the first light source 16a and the second light source 16b are turned off in step SP14.

As described above, according to this embodiment, since the temperature sensors 21, 22, . . . , 2n and the solar cells 51, 52, . . . , 5n are arranged in the wafer thermometer 10, and the first light source 16a is arranged in the case 60c, and the second light source 16b is arranged in the chamber 71, the temperature data provided when the wafer thermometer 10 is heated by the heating plate 62 and cooled by the cooling plate 61 can be externally outputted by wireless without supplying an external power.

In addition, when the solar cells 51, 52, . . . , 5n are used, the usage temperature range can be increased, so that the temperature as high as 200° C. can be measured, for example, and its operation can be easy since charging is not needed unlike a secondary cell. In addition, since the temperature sensors 21, 22, . . . , 2n and the like are not mounted on the processing wafer processed actually, the temperature data measured by the wafer thermometer 10 is calibrated assuming that the temperature sensors 21, 22, . . . , 2n are not mounted.

Although the temperature data after heating and temperature data after cooling are measured in the above description, temperature data during the heating and temperature data during cooling after being heated may be measured.

Although the first light source 16a and the second light source 16b are turned on and off by the command of the computer 14 in the above description, when the filter 162 shown in FIG. 5 is arranged in front of the first light source 16a, the light source may be kept on while the processing wafer is processed.

Although the first antenna 11a is provided in the case 60c and the second antenna 11b is provided on the chamber 70 in the above description, as another arrangement, the first light source 16a may be arranged in the case 60c, only the second light source 16b may be arranged in the chamber cover 71, and the first antenna 11a may be arranged outside the case 60c.

The first light source 16a shown in FIGS. 6A to 6C may be set at any position as long as the wafer thermometer 10 can be irradiated with light in the case 60c. In addition, irradiation may be performed by scanning light from a certain fixed position in the case 60c.

It should be noted that although both heating temperature and cooling temperature are measured in the above description of the measuring method, only one of them may be measured.

In addition, the constitution may be as follows: the transmitting and receiving circuit 46 of the processing circuit 4 may have only the transmission function, the transmitting and receiving circuit 12 provided outside may have only the reception function, and the processing circuit 4 may transmit the temperature data to be received externally regardless of the external command.

Furthermore, the constitution may be as follows: the plurality of cases 60c shown in FIGS. 6A to 6C are arranged on the upper and lower sides and the temperature of the cooling plate 61 and the heating plate 62 are measured at the same time.

According to the above discussed embodiments, since the photoelectric conversion element receives the external light and can supply the current to the converter and the wafer data transmitter, it not necessary to supply an external power or replace or charge the cell.

Preferably, the photoelectric conversion element is provided at a corresponding position irradiated with the external light.

Since the external light is received at the predetermined position, it is not necessary to provide a plurality of photoelectric conversion elements in the wafer thermometer.

Preferably, the plurality of photoelectric conversion elements are provided at different positions.

Since the plurality of photoelectric conversion elements are provided, the external light can be received by any one of the photoelectric conversion elements.

Preferably, the converter, the wafer data transmitter, and the photoelectric conversion element are provided on the wafer other than the regions of the temperature sensors.

Since the temperature sensors are arranged in the regions not having the converter, the wafer data transmitter, and the photoelectric conversion element, the temperature can be measured over the whole region of the wafer.

Preferably, the converter is formed by a thin-film integrated circuit, and the photoelectric conversion element is arranged on the converter.

Since the photoelectric conversion element is arranged on the converter, space can be saved as compared with a case where the photoelectric conversion element is arranged on the wafer.

Preferably, the wafer thermometer includes a constant voltage circuit provided on the wafer for making substantially constant currents to be applied to the converter and the wafer data transmitter.

Since the current is supplied from the constant voltage circuit, the operation can be stabilized.

Preferably, the wafer thermometer includes a wafer data receiver provided on the wafer for receiving external data.

Since the wafer data receiver is provided, the externally transmitted data such as a command to measure the temperature can be received.

Since the wafer thermometer receives light and transmits measured temperature data, it is not necessary to supply an external power thereto.

Preferably, the wafer thermometer includes a wafer data receiver for receiving the external data, and an external data transmitter for transmitting data to the wafer data receiver is externally provided.

After the command to start temperature measurement is externally given, the temperature measurement can be started.

Preferably, a recorder for recording the temperature data received by the external data receiver is provided externally.

Since the temperature data is recorded, the temperature change can be easily tracked.

Since the wafer thermometer includes the first light source, the temperature can be measured in the chamber by the wafer thermometer.

Preferably, the heat treatment device includes an external data receiver for receiving the temperature data transmitted from the wafer data transmitter; and a temperature controlling unit for controlling the temperature of the heat treatment unit, based on the temperature data received by the external data receiver.

Since the temperature data is received by the external data receiver, the temperature of the heating unit can be controlled so as to reach a desired temperature.

Preferably, the heating chamber includes a second light source different from the first light source, for irradiating the photoelectric conversion element with light.

Since the second light source is provided in the heating chamber, the temperature can be measured in the heating chamber.

Preferably, the chamber includes a cooling plate for cooling the processing wafer as the heat treatment unit, and the first light source is provided above the cooling plate to irradiate the photoelectric conversion element with light.

Since the photoelectric conversion element receives the light to generate the electric power during the cooling process also, the temperature can be measured during the process.

Preferably, the first and second light sources emit light having a wavelength ranging from about 400 nm to about 600 nm.

Since the first and second light sources only emit the light having a wavelength range of about 400 nm to about 600 nm, even when the processing wafer is processed while the first and second light sources are on, a resist is not exposed, for example.

Preferably, the wafer thermometer includes a wafer data receiver for receiving a signal, and the chamber includes a chamber data transmitting and receiving unit for transmitting and receiving data to and from the wafer data transmitter or the wafer data receiver of the wafer thermometer.

After the command to transmit the temperature data is given, the transmitted temperature data is received.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

The wafer thermometer, the temperature measuring device, the heat treatment device, and the temperature measuring method according to the present invention are used in measuring the temperature of the wafer set on the cooling plate and the heating plate in the heating and cooling device.

What is claimed as new and is desired to be secured by Letters Patent of the United States is:

1. A wafer thermometer comprising:
    a wafer having an upper surface divided to a plurality of regions;
    a plurality of temperature sensors arranged at the plurality of regions, respectively;
    a converter provided on the wafer and configured to convert signals output from the plurality of temperature sensors to temperature data;
    a wafer data transmitter provided on the wafer and configured to transmit the temperature data converted by the converter; and
    a photoelectric conversion element provided on the wafer and configured to supply a current to the converter and the wafer data transmitter in response to light with which the photoelectric conversion element is irradiated,
    wherein the photoelectric conversion element is arranged directly on the converter.

2. The wafer thermometer according to claim 1, wherein the wafer thermometer comprises a single photoelectric conversion element provided at a position where the light is irradiated.

3. The wafer thermometer according to claim 1, wherein the wafer thermometer comprises a plurality of photoelectric conversion elements provided at different positions.

4. The wafer thermometer according to claim 1, wherein the converter, the wafer data transmitter, and the photoelectric conversion element are provided on the wafer other than areas where the temperature sensors are provided.

5. The wafer thermometer according to claim 1, wherein the converter comprises a thin-film integrated circuit.

6. The wafer thermometer according to claim 1, further comprising:
    a constant voltage circuit provided on the wafer and configured to supply substantially constant current to the converter and the wafer data transmitter.

7. The wafer thermometer according to claim 1, further comprising:
    a wafer data receiver provided on the wafer and configured to receive external data.

8. A temperature measuring device comprising:
    a wafer thermometer comprising:
        a wafer having an upper surface divided to a plurality of regions;
        a plurality of temperature sensors arranged at the plurality of regions, respectively;
        a converter provided on the wafer and configured to convert signals output from the plurality of temperature sensors to temperature data;
        a wafer data transmitter provided on the wafer and configured to transmit the temperature data converted by the converter;
        a photoelectric conversion element provided on the wafer and configured to supply a current to the converter and the wafer data transmitter in response to light with which the photoelectric conversion element is irradiated; and
        an external data receiver provided to be apart from the wafer and configured to receive the temperature data transmitted from the wafer data transmitter,
    wherein the photoelectric conversion element is arranged directly on the converter.

9. The temperature measuring device according to claim 8, the wafer thermometer further comprising:
    a wafer data receiver provided on the wafer and configured to receive external data; and
    an external data transmitter provided to be apart from the wafer and configured to transmit the external data to the wafer data receiver.

10. The temperature measuring device according to claim 8, further comprising:
a recorder configured to record the temperature data received by the external data receiver.

11. A heat treatment device comprising:
a wafer thermometer comprising:
a wafer having an upper surface divided to a plurality of regions;
a plurality of temperature sensors arranged at the plurality of regions, respectively;
a converter provided on the wafer and configured to convert signals output from the plurality of temperature sensors to temperature data;
a wafer data transmitter provided on the wafer and configured to transmit the temperature data converted by the converter; and
a photoelectric conversion element provided on the wafer and configured to supply a current to the converter and the wafer data transmitter in response to light with which the photoelectric conversion element is irradiated, wherein the photoelectric conversion element is arranged directly on the converter; and
a chamber comprising a first light source configured to irradiate the photoelectric conversion element with light; and
a heat treatment unit provided in the chamber to heat or cool a processing wafer, the wafer thermometer being configured to detect a temperature of the heat treatment unit.

12. The heat treatment device according to claim 11, further comprising:
an external data receiver provided to be apart from the wafer and configured to receive the temperature data transmitted from the wafer data transmitter; and
a temperature controller configured to control the temperature of the heat treatment unit based on the temperature data received by the external data receiver.

13. The heat treatment device according to claim 11,
wherein the chamber comprises a second light source in addition to the first light source, the second light source being configured to irradiate the photoelectric conversion element with light.

14. The heat treatment device according to claim 11,
wherein the heat treatment unit comprises a cooling plate configured to cool the processing wafer, and
wherein the first light source is provided above the cooling plate to irradiate the photoelectric conversion element with light.

15. The heat treatment device according to claim 13,
wherein the first and second light sources emit light having a wavelength ranging from about 400 nm to about 600 nm.

16. The heat treatment device according to claim 11,
wherein the wafer thermometer comprises a wafer data receiver configured to receive a signal, and
wherein the chamber comprises a chamber data transmitter/receiver configured to transmit data to the wafer data receiver and configured to receive data from the wafer data transmitter.

17. A method for measuring a temperature of a heat treatment unit, the method comprising:
providing a wafer thermometer on the heat treatment unit for heating or cooling a processing wafer, the wafer thermometer having a photoelectric conversion element, temperature sensors, and a converter configured to convert signals output from the temperature sensors to temperature data;
irradiating the photoelectric conversion element with light;
measuring a temperature of the heat treatment unit using the wafer thermometer; and
transmitting the temperature data showing the measured temperature using power supplied from the photoelectric conversion element,
wherein the photoelectric conversion element is arranged directly on the converter.

18. The method according to claim 17,
wherein the temperature data is transmitted in response to a command to transmit the temperature data.

19. A wafer thermometer comprising:
a wafer having an upper surface divided to a plurality of regions;
temperature sensing means for sensing temperature and arranged at the plurality of regions, respectively;
converting means for converting signals output from the plurality of temperature sensing means to temperature data and provided on the wafer;
wafer data transmitting means for transmitting the temperature data converted by the converting means and provided on the wafer; and
photoelectric conversion means for supplying a current to the converting means and the wafer data transmitting means in response to light with which the photoelectric conversion means is irradiated, the photoelectric conversion means being provided on the wafer,
wherein the photoelectric conversion means is arranged directly on the converting means.

* * * * *